UNITED STATES PATENT OFFICE.

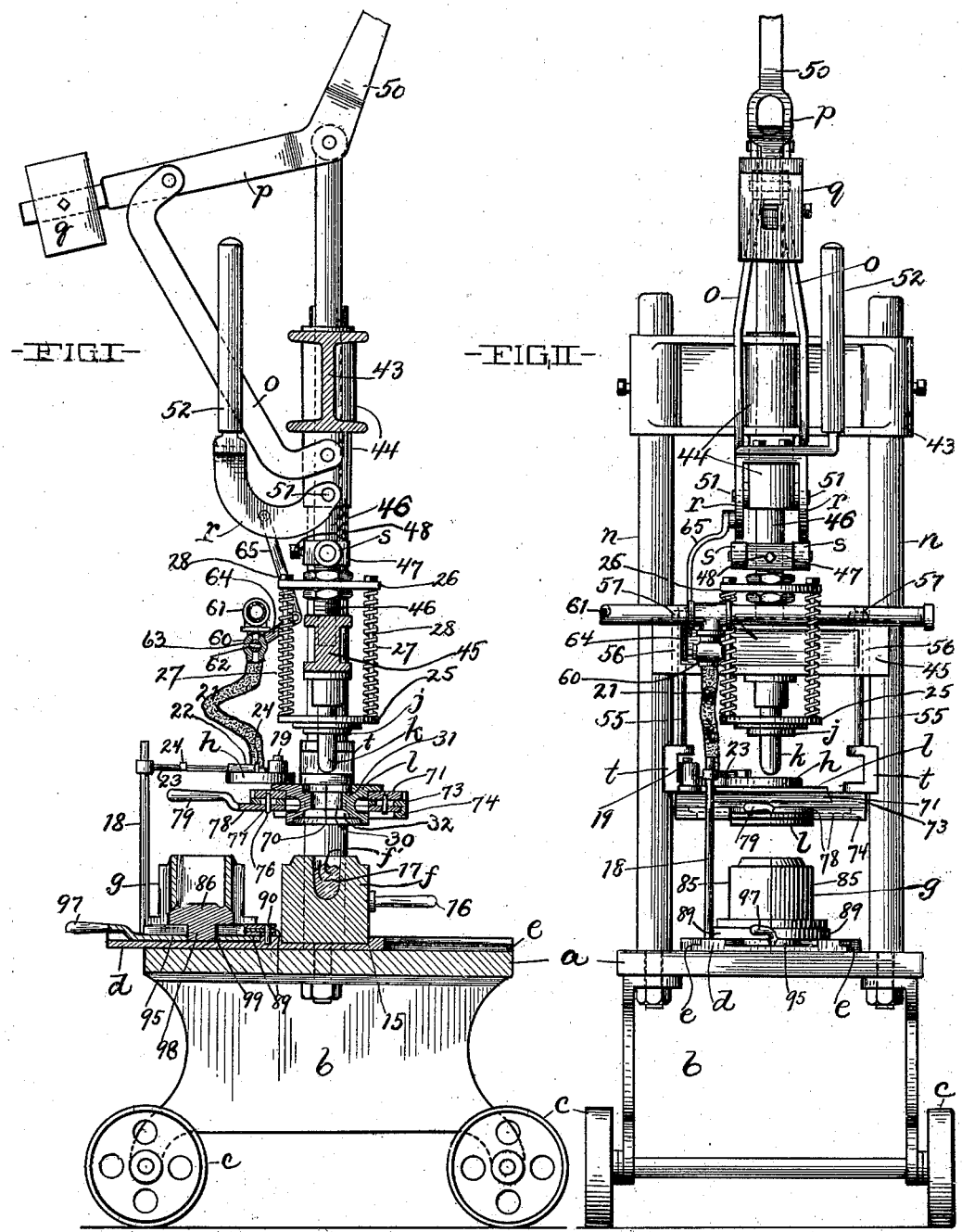

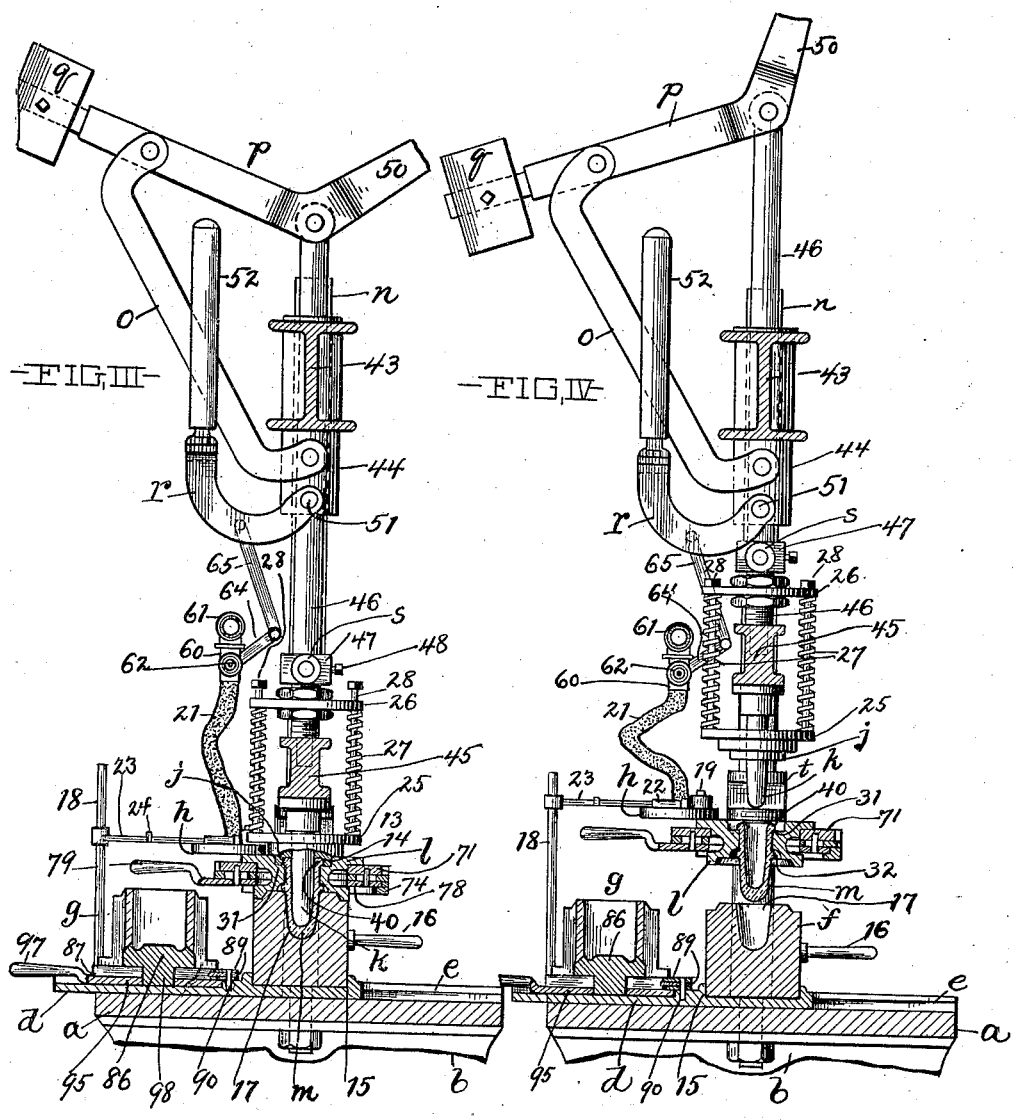

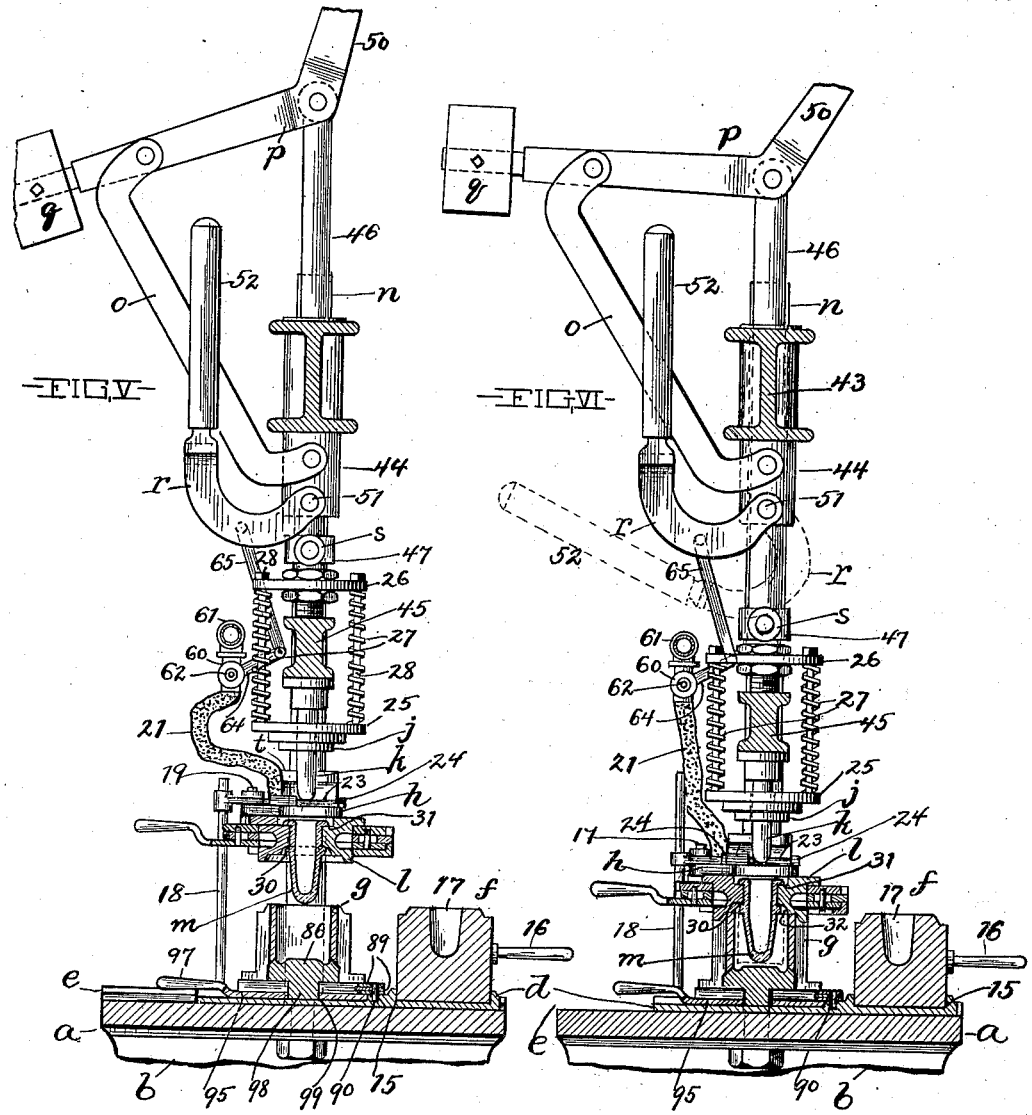

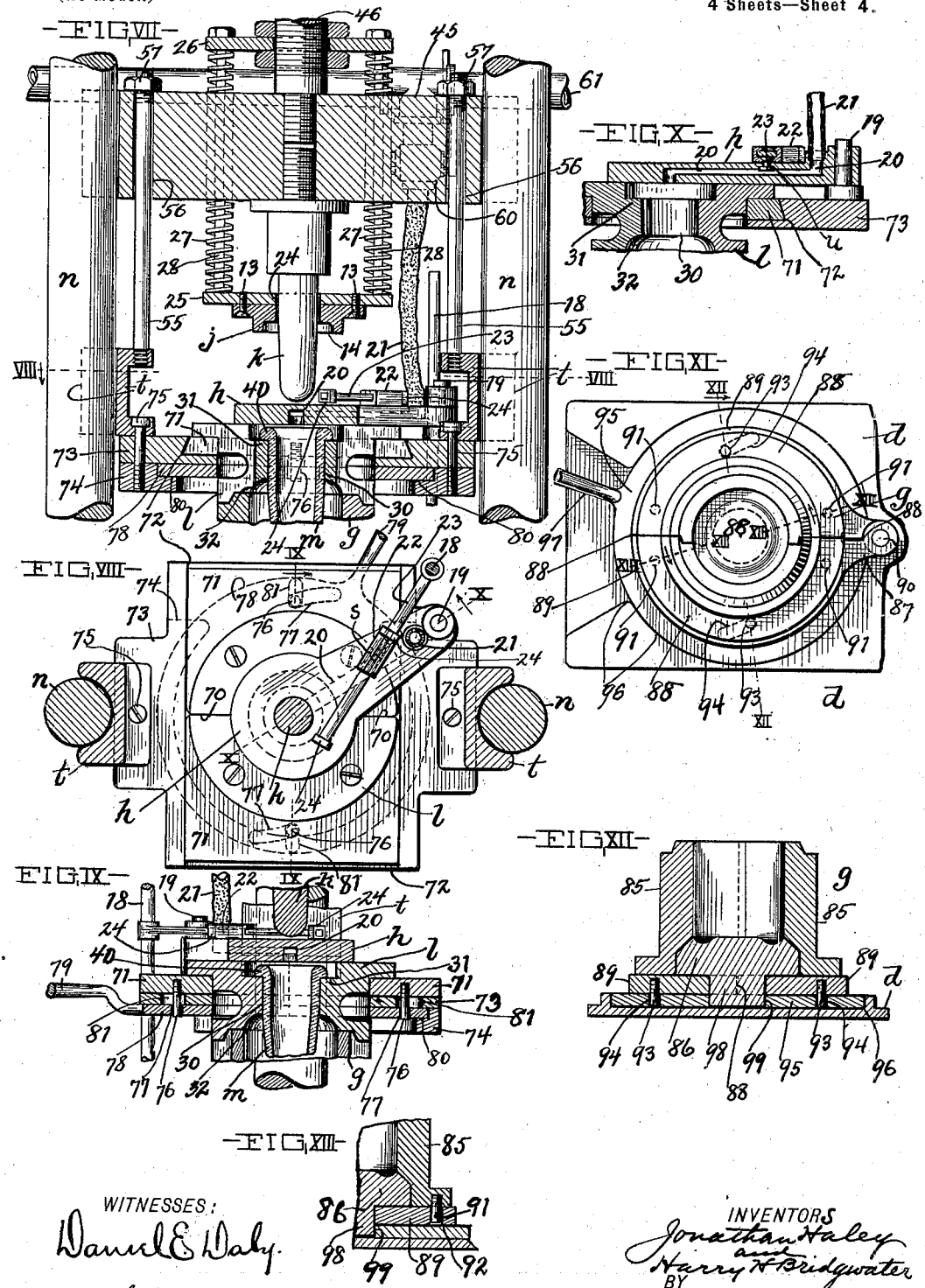

JONATHAN HALEY AND HARRY H. BRIDGWATER, OF AKRON, OHIO; SAID HALEY ASSIGNOR TO SAID BRIDGWATER.

APPARATUS FOR FORMING HOLLOW GLASS ARTICLES.

SPECIFICATION forming part of Letters Patent No. 654,451, dated July 24, 1900.

Application filed December 28, 1899. Serial No. 741,848. (No model.)

*To all whom it may concern:*

Be it known that we, JONATHAN HALEY and HARRY H. BRIDGWATER, residing at Akron, county of Summit, and State of Ohio, have invented certain new and useful Improvements in Apparatus for Forming Hollow Glass Articles; and we do hereby declare the following to be a full, clear, and exact description of the invention, such as will enable others skilled in the art to which it pertains to make and use the same.

Our invention relates to improvements in apparatus for forming hollow glass articles—such, for instance, as bottles and jars; and the invention relates more especially to the formation of hollow glass articles by first pressing or molding a quantity of glass into a hollow form and then expanding the blank by blowing into the latter.

Heretofore one great obstacle encountered in an effort to manufacture a perfect jar or bottle was the imperfections appearing upon the neck of the bottle or jar and resulting from a lateral sliding or removal of the jar or bottle from one to another of the molds required or employed in the formation of the said article. The imperfections referred to consisted in crizzles formed, mainly, on the neck of the article, but formed also upon other portions of the article.

The primary object of our present invention is to avoid the said crizzles or imperfections in the hollow glass article being formed by requiring the blank to be moved vertically only, and hence avoiding any lateral movement of the blank.

Other objects of this invention are to simplify the construction of apparatus of the character indicated, to render the same more convenient and reliable in its operation, and to reduce the cost of hollow glassware adapted to be formed by the said apparatus.

With these objects in view and to the end of realizing other advantages hereinafter appearing the invention consists in certain features of construction and combinations of parts hereinafter described, and pointed out in the claims.

In the accompanying drawings, Figures I and II are elevations, at right angles to each other, of apparatus embodying our invention, and portions are broken away and in section in the said figures to more clearly show the construction and to reduce their size. In these figures the press-mold employed in the formation of the lower portion of the blank is shown in position below the mold instrumental in the formation of the neck of the article and below the plunger employed in the formation of the blank within the said molds. Fig. III is an elevation partly in section and corresponding with Fig. I, except that in Fig. III the neck-forming mold is lowered upon the press-mold and the plunger has formed the blank within the said molds. Fig. IV is an elevation partly in section and corresponding with Fig. III, except that in Fig. IV the plunger and the neck-forming mold are elevated the distance required to free the blank attached to the neck-mold from the press-mold. Fig. V is an elevation partly in section and corresponding with Fig. IV, except that in Fig. V the slide that carries the press-mold and the blow-mold is shown in the position required to bring the blow-mold and the blow-plate into an operative position. Fig. VI is an elevation partly in section and corresponding with Fig. V, except that in Fig. VI the neck-mold and the blow-plate are lowered into an operative position relative to the blow-mold. Fig. VII is a side elevation, mostly in section, showing the plunger, plunger-slide, the slideways for the said slide, the neck-mold, the means of supporting the neck-mold from the plunger-slide, the blow-plate, and other parts, and the position of the parts in this figure corresponds to the position of the corresponding parts shown in Fig. VI. Fig. VIII is a transverse section on line VIII VIII, Fig. VII, looking downwardly. Fig. IX is an elevation, mostly in section, on line IX IX, Fig. VIII, looking in the direction of the arrow. Fig. X is an elevation, mostly transverse section, on line X X, Fig. VIII, except that the blank *m* and the plunger *k* are not shown in Fig. X. Fig. XI is a top plan of the blow-mold and its support. Fig. XII is an elevation, mostly in section, on line XII XII, Fig. XI. Fig. XIII is a vertical section on either one of lines XIII XIII, Fig. XI, looking in the direction of the arrow.

Referring to the drawings, *a* designates a horizontally-arranged table that forms the top of a carriage b, that is provided with wheels c to render it conveniently portable and readily movable from one place to another. A horizontally-arranged slide or mold-carrier d is mounted upon the table a and movable longitudinally of the carriage. The slide d engages, therefore, the slideway e, formed upon and longitudinally of the table a, in any approved manner. The press-mold f and the blow-mold g are supported from the slide d in any approved manner. The molds f and g are arranged a suitable distance apart and in line longitudinally of the said slide. The mold f engages, preferably, a recess 15, formed in the slide, and is provided in the usual manner with a handle 16 and with a centrally-located chamber 17, that is open at the top of the mold and is adapted to receive the quantity of glass employed for pressing or molding the blank within the said mold, as will hereinafter more fully appear. The blow-mold g is in the apparatus illustrated arranged between the press-mold f and a column or post 18, that is instrumental in actuating the blow-plate h from an inoperative to an operative position, or vice versa. The plate h rests upon the neck-mold l. The blow-mold has its chamber open at the top in the usual manner to accommodate the passage of the blank into the said mold and the subsequent operation upon the blank.

The post or column 18 is rigid with the slide d, and the blow-plate h has a passage-way 20 (see Fig. X) extending therethrough and employed in establishing open relation between the interior of the blank introduced into the blow-mold and the flexible blow-tube 21, that is attached to the blow-plate in any approved manner at the receiving end of the passage-way 20.

A vertically-movable vertically-arranged plunger k, that is supported and operated as will hereinafter appear, is employed in forming the blank within the molds f and l. The plunger k is therefore arranged in the vertical plane that contains the mold l and has such arrangement relative to the chamber of the neck-mold that the said chamber and the aforesaid plunger shall be in registry at all times and the plunger and the neck-mold shall be in line with the press-mold f or with the blow-mold, according as the latter or the former is upon actuating the slide d in the required direction moved in under and in line with the neck-mold and the plunger.

As already indicated, the apparatus illustrated is more especially designed for forming hollow glass articles—such, for instance, as a jar or bottle—having a neck provided with an external rib, thread, flange, or other configuration that will render the article or the blank capable of being suspended from the neck-mold employed in the formation of the said neck. The neck-mold l is provided with a centrally-located chamber 30, that is open at top and bottom, which chamber has its surrounding wall conforming to the external configuration of the neck that is to be formed upon the blank. The neck-mold l has such an arrangement relative to the path of the press-mold f and the blow-mold g that, as already indicated, the blow-mold or the press-mold is brought into registry with and below the neck-mold upon moving the slide d in the direction and to the extent required without necessitating a lateral movement of the neck-mold. The plunger k and the chamber of the neck-mold are in registry, and the chamber of the neck-mold has such dimensions transversely relative to the thickness of the plunger as will accommodate the passage and operation of the plunger centrally through the neck-mold and at the same time leave enough space surrounding the plunger to form a suitable thickness of glass between the plunger and the surrounding wall of the neck-mold's chamber. The neck-mold and the plunger are movable together vertically to a limited extent, as will hereinafter fully appear, and of course preparatory to the movement of the press-mold f upon supplying the latter with the requisite quantity of molten glass f' (see Fig. 1) in under the plunger and the neck-mold the latter and the plunger are elevated, if not already, the distance required to accommodate the movement of the press-mold below the neck-mold. When the glass-laden press-mold has been brought below and into registry with the neck-mold, the neck-mold is lowered into an operative position upon the press-mold and the plunger is lowered into the press-mold through the neck-mold and forms the blank within the said molds, as shown in Fig. III. During the operation of the plunger k some of the molten glass is displaced upwardly into the neck-mold and into any diametrical or lateral enlargement of the chamber 30 of the said mold, so that when the plunger and the neck-mold are subsequently withdrawn from the press-mold the blank will be suspended from the neck-mold. For instance, the neck-mold illustrated has the upper end of its chamber 30 enlarged diametrically, so as to form an upwardly-facing annular shoulder 31, over which some of the molten glass is displaced during the blank-forming operation, and consequently the blank's upper end, that overlaps the said shoulder, prevents the blank, and consequently the finished article, from dropping from the neck-mold until released by the latter upon separating the sections composing the said mold, as will hereinafter appear.

m designates the blank, and 40 the lip, flange, or diametrical enlargement of the upper end of the blank and overlapping the shoulder 31 of the neck-mold. (See Figs. VII and IX.)

When the neck-mold and the plunger have been withdrawn from the press-mold far enough to remove the blank from the press-mold, as shown in Fig. IV, the slide d is shifted endwise to remove the press-mold from in under the neck-mold and to bring the blow-mold below the blank and into registry with the neck-mold and the plunger, as shown in Fig. V, whereupon the neck-mold is lowered as required to introduce the blank into the blow-mold, as shown in Fig. VI, and to bring the neck-mold into operative position relative to the blow-mold. The actuation of the slide $d$ as required to bring the blow-mold into registry with the neck-mold results in the actuation of the blow-plate $h$ upon the neck-mold, as will hereinafter more fully appear, into an operative position relative to the neck-mold and the blank suspended from the neck-mold, so that air under pressure now introduced into the blow-plate will be conducted into the blank and expand the latter within and in conformity to the blow-mold.

It will have been observed that by our improved construction the blank is moved vertically in removing it from the press-mold and in subsequently lowering it into the blow-mold without being moved laterally, and consequently any crizzles or other imperfections that would be formed in the blank from a lateral movement of the latter are avoided.

The neck-mold is preferably constructed to render it instrumental in forming the upper extremity of the body of the bottle or jar being made, and hence the chamber of the central or neck-forming portion of the said mold is enlarged diametrically at its lower end, as at 32, (see Figs. IX and X,) so that the body of the article being blown within the mold will be expanded into the said enlargement of the neck-mold's chamber and cause the neck-mold to form or shape the upper end of said body, as shown in dotted lines, Fig. VI.

The blow-mold, as well as the neck-mold, is made in sections that are readily separable to accommodate the removal of the finished article from the said molds.

A mold-ring $j$ is employed in the formation of the upper edge or end of the bottle, jar, or article being made. The upper diametrical enlargement of the chamber 30 of the neck-mold is not only large enough to accommodate the displacement of glass over the shoulder-forming bottom 31 of the said enlargement, but to receive the mold-ring $j$, that is provided with an internal annular recess 14, (see Figs. III and VII,) whose surrounding wall has the form required to mold or shape the lip or flange 40 desired to be formed upon the upper end of the blank, as shown more clearly in Fig. III, wherein the mold-ring is in position upon the shoulder 31. The ring $j$ is preferably detachably secured, by means of screws 13, (see Fig. VII,) to the lower end of a cushion that is suspended from the stem 46 and comprises, preferably, two horizontal plates 25 and 26, arranged a suitable distance apart vertically, and springs 27, interposed between the said plates. The springs 27 are spiral springs coiled upon bolts 28, that are screwed into the lower plate 25, extend easily through the upper plate 26, and have their heads arranged at the upper side of the upper plate. The upper plate 26 is rigidly secured to the stem 46 in any approved manner, and the lower plate loosely embraces the plunger $k$ and has its centrally-located hole 24 (see Fig. VII) large enough to freely accommodate the location and operation of the plunger. The arrangement of the parts is such that during the pressing operation of the plunger the mold-ring enters the neck-mold and somewhat yieldingly engages the upper end of the blank.

Two columns or standards $n$ and $n$ are rigidly secured to the table $a$ opposite each other and at opposite sides, respectively, of the path of the plunger and the neck-mold. A yoke 43 ties together and braces apart the upper ends of the standards $n$ and $n$ and is secured to the said standards in any approved manner. The plunger $k$ is arranged centrally between the standards $n$ and $n$ and is rigid with and depends from the under side of a slide 45, that is properly denominated the "plunger-slide," and is arranged horizontally and between the standards $n$ and $n$, that are partially embraced by the ends of the slide, and consequently form slideways for the slide. The plunger-slide at the top and centrally is provided with an upwardly-extending vertically-arranged stem 46, that extends through and has bearing within a box 44, formed centrally of the yoke 43 and extending a suitable distance below the said yoke. Two arms $o$ and $o$ are pivoted horizontally at and to opposite sides, respectively, of the said box-forming depending member 44 of the yoke 43 and extend laterally of and upwardly from the yoke a suitable distance above the yoke, and a lever $p$ is fulcrumed horizontally to and between the upper ends of the said arms $o$. The said lever extends laterally of its fulcrum to and over the yoke in the one direction and extends laterally of its fulcrum in the opposite direction and has its last-mentioned portion provided with a poise or counterbalance $q$. The lever $p$ is operatively connected with the plunger-slide's stem 46 in any approved manner and is provided with a handle 50 at the upper end of the said stem. The lever $p$ is of course instrumental in operating the plunger.

The neck-mold is normally supported from the plunger-slide and in the apparatus illustrated is supported from two slides $t$ and $t$, (see Figs. VII and VIII,) that partially embrace the different slideway-forming columns or standards $n$ and $n$, respectively, and are provided with vertically-arranged upright studs or rods 55, that extend easily through vertical holes or perforations 56, formed in the plunger-slide 45, and having their upper ends provided with heads or members 57, overlapping the upper side of the plunger-slide. In the normal position of the parts the heads or members 57 of the rods or studs 55 overlap and rest upon the upper side of the plunger-slide, and consequently the neck-mold is suspended from the plunger-slide, as shown in Figs. II and VII. Upon lowering the plunger-slide by properly manipulating the lever $p$ the plunger and the neck-mold are lowered simultaneously until the neck-mold rests upon the press-mold $f$ or the blow-mold $g$, according as the press-mold or blow-mold is below and in line with the neck-mold. The neck-mold lowers by gravity. The hereinbefore-described peculiar connection of the neck-mold with the plunger-slide permits the said slide, and consequently the plunger, to move downwardly independently of the neck-mold when the latter is in position upon the press-mold or upon the blow-mold.

The blow-plate is swiveled upon or vertically pivoted at one end, as at 19, to the neck-mold support at one side of the neck-mold's chamber and near one of the columns or standards $n$, as shown more clearly in Figs. VIII, IX, and X. The receiving end of the passage-way 20, extending through the blow-mold, as shown in Fig. X, is in open relation with the tube 21. The discharging end of the said passage-way is in open relation with the interior of the blank when the blow-plate is in an operative position relative to the blank-carrying neck-mold. Hence the arrangement of the parts is such that the blow-plate is rendered operative or inoperative, according as it is swung into the one or the other of its extreme positions. A horizontally-arranged box or sleeve 22 is swiveled, as at $s$, as shown in Fig. X, upon the blow-plate near the central portion of the plate. The rod or bar 23 has bearing in and extends through the box 22 and is journaled at one end upon and movable up and down the post or column 18. Two shoulders 24 and 24 are formed upon the bar or rod 23 a suitable distance apart and at opposite ends, respectively, of the sleeve or box 22, and the arrangement of the parts is such that the one or the other shoulder 24 shall abut against the box, according as the blow-plate is swung into the one or the other of its two positions. Hence one of said shoulders constitutes a stop to limit the movement of the blow-plate in the one direction, and the other shoulder forms a stop that limits the movement of the said plate in the opposite direction. The hereinbefore-described peculiar connection of the blow-plate with the post or column 18 accommodates the descent of the blow-plate with the neck-mold when the latter is lowered upon the blow-mold preparatory to the blowing operation.

Two cams $r\,r$ are arranged at opposite sides, respectively, of the plunger-slide's stem and are pivoted horizontally, as at 51, to and transversely of opposite sides, respectively, of the lower end of the box 44, below the aforesaid arms $o$. A lever or handle 52 is attached to both of the said cams in any approved manner and is capable of simultaneously operating both cams. The different cams $r$ are arranged to operate upon different shoulders, respectively, formed upon opposite sides, respectively, of the aforesaid stem, a suitable distance below the box 44 and between the said box and the plunger-slide. The shoulders are formed, preferably, by different rollers $s$ and $s$, respectively, arranged horizontally at and supported from opposite sides, respectively, of a collar 47, that is fixed upon the aforesaid stem, preferably by means of the set-screw 48. The arrangement of the cams and the antifriction-rollers is such that when the plunger is at the elevation required to render it capable of descending upon the blow-plate when the latter is in an operative position upon the neck-mold, the tilting of the cams downwardly upon the shoulder-forming rollers $s$ lowers and holds the plunger downwardly upon the blow-plate, as shown in dotted lines, Fig. VI.

A valve-casing 60 connects together and is interposed between the flexible tube 21 and an air-pressure-supply pipe 61. A plug-valve 62 is arranged to operate within the said valve-casing, and the port 63, (see Fig. I,) that extends through the plug, is arranged as required to render it capable of establishing or interrupting open relation between the tube 21 and the pipe 61, according as the plug is turned into the one or the other of its extreme positions. The plug is provided at one end and outside of the valve-casing with a lever 64 for turning the plug, and a link 65 operatively connects the said lever with the cams $r$, and the arrangement of the said parts is such that the plug shall be closed in the normal position of the parts, as shown in Fig. I, and shall be opened simultaneously with and by the operation of the cams $r$, so that when the blow-plate is in an operative position and properly held down upon the neck-mold the air-pressure-supply pipe shall be in open relation with the passage-way in the blow-plate.

The operation of the apparatus hereinbefore described is as follows: Preparatory to the commencement of the operation of the machine the plunger and the neck-mold are elevated to permit the movement of the press-mold $f$ underneath the neck-mold. A quantity of molten glass required to form a blank is introduced into the press-mold, whereupon the mold-bearing slide $d$ is actuated in the direction required to bring the said mold in under and into registry with the neck-mold. The stem 46 and the connected plunger and the neck-mold are then lowered by tilting the handle-bearing end of the lever $p$ downwardly. The neck-mold lowers by gravity during the lowering of the plunger, so that when the neck-mold has been lowered into an operative position upon the press-mold it is capable of being further lowered independently of the neck-mold, and the plunger, in its descent, after the neck-mold has been lowered upon the press-mold, passes into the press-mold through the neck-mold, and presses or displaces the molten glass within the press-mold and into the neck-mold as required to form the blank required for the subsequent blowing operation. During the lowering of the plunger into the press-mold the mold-ring $j$ enters the neck-mold and a complete blank is formed, as shown in Fig. III, and suspended from or attached to the neck-mold. When the blank has been formed within the press-mold, neck-mold, and mold-ring, as hereinbefore described, the mold-ring, plunger, and the neck-mold are elevated the distance required to remove them from the press-mold and to free the blank (that is now suspended from the neck-mold) from the press-mold, as shown in Fig. IV, and accommodate the removal of the press-mold and to permit the passage in under the suspended blank of the blow-mold. When the mold-bearing slide $d$ has been actuated in the direction and to the extent required to bring the blow-mold in under and into registry with the suspended blank, the blow-plate is simultaneously actuated into an operative position upon the neck-mold, and thereupon the plunger is again lowered, so as to permit the lowering of the neck-mold by gravity upon the blow-mold, and of course during the lowering of the neck-mold the blow-plate descends by gravity with the neck-mold. When the neck-mold and the blow-plate have been thus lowered, the plunger is by the operation of the cams $r$ depressed and caused to bear downwardly upon the blow-plate and retains the latter in its operative position upon the neck-mold. The valve that controls the supply of wind or air under pressure to the blow-plate is operated simultaneously with the operation of the aforesaid cams, and the air under pressure passes to the blow-plate and thence enters the chamber of the blank and expands the latter, as indicated in dotted lines, Fig. VI. When the blank has been expanded as required, the plunger is released from the operation of the cams, so as to close the aforesaid valve, whereupon the neck-mold and the blow-mold are opened to accommodate the removal of the finished article.

Obviously two operators are required to operate the apparatus and are stationed at opposite sides, respectively, of the machine, and the said operators can take care of several machines arranged in a row. One of the operators attends to the operation of the lever $p$ and to the actuation of the mold-bearing slide $d$ in the direction required to bring the laden press-mold in under the neck-mold, and the other operator attends to the operation of the blow-mold, blow-plate, and cams $r$ and to the opening and closing of the neck-mold and blow-mold.

The neck-mold (see Figs. VIII, IX, and X) is divided centrally, as at 70, into two halves or sections that nicely fit each other when assembled and rest upon different horizontally-arranged plates or slides 71 and 71, that are capable of sliding from and toward each other, and engages slideways 72, formed upon a horizontally-arranged plate 73, that is interposed between the slides $t\,t$ and a horizontally-arranged plate 74, that partially surrounds the neck-mold. The plate 74 and plate 73 are secured to the slides $t\,t$ by screws 75, and the plate 73 is cut away centrally to accommodate the location of the neck-mold. The two neck-mold sections rest upon and are secured to the different slides 71 and 71, respectively. Each slide 71 has upon its under side a depending lug or pin 76, that engages a cam-forming slot or elongated hole 77, formed in a horizontally-arranged cam-plate 78, capable of being turned in a horizontal plane. Plate 78 rests upon and is seated and confined within a recess 80, formed in the plate 74. The said plate 78 is provided with a handle 79 for turning the same. The plate 78 is provided, therefore, with two slots or holes 77 and 77, arranged a suitable distance apart, and one of the said slots or holes is engaged by the depending pin or lug of one of the slides 71, and the other slot or hole 77 is engaged by the other depending lug or pin of the other slide. The arrangement, trend, and length of the slots or holes 77 are such that the neck-mold sections are closed together or separated the distance required to permit the removal of the finished glass article therefrom, according as the aforesaid cam-plate is turned or oscillated in the one or the other direction. The plate 73 is slotted, as at 81, to accommodate the location and operation of the pins 76. The slides $t\,t$ and the plates 73 and 74 constitute a vertically-movable carriage that carries the neck-mold and is provided with the slideways for the slides that bear the neck-mold sections and carries the mechanism employed for moving the said mold-sections apart or close them together, according as the neck-mold is to be opened or closed.

The blow-mold is composed of three sections—viz., two upright sections 85 and 85, forming opposite sides, respectively, of the mold, and a horizontally-arranged section 86, forming the bottom of the mold. (See Figs. XI and XII.) The said mold-sections are suitably constructed to render them capable of nicely fitting one another when assembled. The blow-mold rests upon and is removably secured to a base 87, that is divided centrally of the mold, as at 88, into two parts or arms 89 and 89, that at the joint formed between the side sections of the mold are pivoted together vertically, as at 90, and to the mold-bearing slide $d$, so as to render the said parts 89 and 89 capable of being swung apart or toward each other. Each slide-section of the blow-mold has upon its under side (see Figs. XII and XIII) any suitable number of depending lugs or pins 91. The pins or lugs 91 of one of the mold-sections 85 engages corresponding holes 92, formed in one of the base-sections 88, and the lugs or pins 91 of the other mold-section 85 engage corresponding holes formed in the other base-section. Hence each mold-section is prevented from displacement upon the base-section underneath the said mold-section. Each base-section is provided upon its under side with a depending lug or pin 93, that engages a slot or elongated hole 94, formed in a horizontally-arranged cam-plate 95, that is capable of being oscillated within a recess 96, formed in the slide d, which recess has its surrounding wall arranged as required to prevent displacement of the plate upon the said slide. The plate has a handle 97 for operating the same. By the construction hereinbefore described it will be observed that the cam-plate has two slots or holes 94 and 94 arranged a suitable distance apart, that one of the said slots or holes is engaged by the pin or lug 93 of one of the base-sections, and that the other slot or hole 94 is engaged by the depending lug or pin 93 of the other base-section. The arrangement, trend, and length of the slots or holes 94 are such that the side sections of the mold are closed together or separated, as required, to permit the movement of the finished glass article from the mold, according as the cam-plate 95 is oscillated in the one or the other direction. The bottom of the mold is provided upon its under side and centrally with a depending stem 98, that extends into and snugly engages a corresponding hole 99, formed in the cam-plate 95, and the sections of the base are suitably cut away at their adjacent edges to accommodate the location of the said stem. The bottom of the mold is therefore removable and can readily be replaced by another bottom having a different design.

What we claim is—

1. Apparatus of the character indicated, comprising a suitably-supported horizontally-arranged endwise-shiftable mold-carrier, a press-mold and a blow-mold mounted upon the said carrier independent of each other a suitable distance apart and in line longitudinally of the carrier, a suitably-operated neck-mold shiftable a suitable distance above the path of the said molds and arranged to be moved downwardly upon the press-mold or blow-mold according as the latter or the former is, by moving the mold-carrier in the direction and to the extent required, brought beneath the neck-mold, a vertically-movable plunger arranged in line with the neck-mold, and means for operating the plunger, substantially as set forth.

2. Apparatus of the character indicated, comprising a suitably-supported endwise-shiftable horizontally-arranged or approximately horizontally arranged mold-carrier, a blow-mold borne by the said carrier, a suitably-operated neck-mold shiftable up and down above the path of the blow-mold and arranged to be moved downwardly upon the blow-mold when the latter, by moving the aforesaid mold-carrier in the direction and to the extent required, is brought beneath and into registry with the neck-mold, a suitably-supported blow-plate shiftable into an operative position upon the neck-mold, and such an operative connection between the blow-plate and the aforesaid mold-carrier as will cause the blow-plate to be moved into or out of an operative position according as the blow-mold is moved in the direction and to the extent required to bring the blow-mold into or out of registry with the neck-mold, substantially as and for the purpose set forth.

3. Apparatus of the character indicated, comprising a suitably-supported horizontally-arranged slide, a blow-mold mounted upon the said slide, a suitably-operated neck-mold shiftable vertically above the path of the blow-mold and arranged to be moved downwardly upon the blow-mold when the latter, by moving the mold-bearing slide in the direction and to the extent required, is brought underneath and into registry with the neck-mold, a suitably-supported blow-plate shiftable into an operative position upon the neck-mold, and such an operative connection between the blow-plate and the aforesaid mold-bearing slide, as will cause the blow-plate to be moved into or out of an operative position according as the said slide is shifted in the direction and to the extent required to bring the blow-mold into or out of registry with the neck-mold, substantially as set forth.

4. In apparatus of the character indicated, the combination, with a horizontally-arranged slideway, a slide engaging the said slideway, a blow-mold mounted upon the slide, and a neck-mold movable up and down above the path of the blow-mold, of the blow-plate upon the neck-mold, and mechanism whereby the blow-plate is actuated upon the neck-mold from an inoperative to an operative position, or vice versa, according as the mold-bearing slide is shifted to the extent required in the one direction or the other, substantially as set forth.

5. In apparatus of the character indicated, the combination with a suitably-supported horizontally-arranged or approximately horizontally arranged endwise-shiftable mold-carrier, a blow-mold borne by the said carrier, and a neck-mold movable up and down above the path of the blow-mold, of a blow-plate upon the neck-mold and supported so as to render it capable of being oscillated upon the neck-mold and rendered operative or inoperative according as it is oscillated in the one or the other direction, and mechanism whereby the blow-plate is oscillated upon the neck-mold from an inoperative to an operative position, or vice versa, according as the aforesaid mold-carrier is shifted, to the extent required, in the one direction or the other.

6. Apparatus of the character indicated, comprising a horizontally-arranged slide, a slideway for the slide, a suitably-operated neck-mold, a blow-plate movable upon the neck-mold and supported so as to render it capable of being oscillated upon the neck-mold and rendered operative or inoperative according as it is oscillated in the one or the other direction, and such an operative connection between the blow-plate and the aforesaid slide as will cause the blow-plate to be rendered operative or inoperative according as the slide is actuated to the required extent in the one direction or the other.

7. In apparatus of the character indicated, the combination, with a horizontally-arranged slide, a slideway for the slide, the vertically-movable neck-mold, a blow-plate swiveled to and upon the neck-mold, an upright post or stud supported from the aforesaid slide, a rod or bar journaled upon the said stud or post and extending over the blow-plate, and a box affording bearing for the said bar or rod and swiveled to the blow-plate, and the arrangement of parts being such that the blow-plate is swung into an operative position over the neck-mold or rendered inoperative according as the aforesaid slide is actuated endwise, to the extent required, in the one direction or the other.

8. The combination, with a horizontally-arranged slide, a slideway for the slide, and the vertically-shiftable neck-mold, of the blow-plate $h$ mounted upon and swiveled to the neck-mold, as at 19, the upright stud or post 18 secured to the aforesaid slide, the rod or bar 23 journaled upon the said post or stud and having the shoulders 24 and 24, and the box 22 swiveled to the blow-plate, substantially as shown, for the purpose specified.

9. Apparatus of the character indicated, comprising a vertically-movable plunger, means for operating the plunger, a vertically-movable neck-mold arranged in line with the plunger, such an operative connection between the neck-mold and the plunger-operating means as will render the plunger and the neck-mold shiftable simultaneously but permit the plunger to lower independently of the neck-mold when the latter is in its lowermost and operative position, a horizontally-arranged slide underneath the path of the neck-mold and the plunger, a press-mold and a blow-mold mounted upon the said slide a suitable distance apart longitudinally of the slide and having such arrangement, relative to the neck-mold, that the press-mold or the blow-mold shall be brought into registry with the neck-mold upon actuating the aforesaid slide to the extent required in the one direction or the other, a blow-plate movable upon the neck-mold, and such an operative connection between the blow-plate and the aforesaid slide that the said plate is rendered operative or inoperative according as the blow-mold or the press-mold is brought into registry with the neck-mold, substantially as and for the purpose set forth.

10. Apparatus of the character indicated, comprising a suitably-supported horizontally-arranged slide, a blow-mold mounted upon the said slide, a suitably-operated neck-mold shiftable vertically above the path of the blow-mold and arranged to be moved downwardly upon the blow-mold when the latter, by moving the mold-bearing slide in the direction and to the extent required, is brought underneath and into registry with the neck-mold, a suitably-supported blow-plate shiftable into an operative position upon the neck-mold, such an operative connection between the blow-plate and the aforesaid mold-bearing slide as will cause the blow-plate to be moved into or out of an operative position according as the said slide is shifted in the direction and to the extent required to bring the blow-mold into or out of registry with the neck-mold, and means for bearing downwardly upon the blow-plate when the latter is in its operative position.

11. Apparatus of the character indicated, comprising a vertically-movable slide having a depending plunger and an upwardly-extending stem, slideways for the said slide, lever mechanism for operating the plunger-slide and operatively connected with the aforesaid stem, a neck-mold movable vertically and arranged below the aforesaid slide and in line with the plunger, such an operative connection between the neck-mold and the plunger-slide as will accommodate the lowering of the neck-mold with the said slide but permit the latter to move downwardly independently of the neck-mold when the latter is in its lower and operative position, a suitably-operated mold-bearing slide arranged below the path of the neck-mold, a press-mold and a blow-mold mounted upon the mold-bearing slide a suitable distance apart and capable, respectively, of registering with the neck-mold upon actuating the said slide to the extent and in the direction required, a blow-plate resting upon the neck-mold and having the air passage-way therethrough registering with the chamber of the neck-mold in the operative position of the blow-plate, means for actuating the blow-plate from an inoperative to an operative position, or vice versa, and means for causing the plunger to bear downwardly upon the blow-plate in the latter's operative position.

12. In apparatus of the character indicated, the combination, with the neck-mold, a suitably-supported blow-plate shiftable into an operative position upon the neck-mold and having a passage-way extending therethrough and arranged to register with the neck-mold's chamber in the blow-plate's operative position, and mechanism for actuating the blow-plate from an inoperative to an operative position, or vice versa, of mechanism instrumental in holding the blow-plate down upon the neck-mold when the blow-mold is in an operative position, a passage-way for supplying fluid under pressure to the blow-plate's internal passage-way, a valve controlling the supply of fluid to the fluid-supply passage-way, and such an operative connection between the said valve and the aforesaid blow-plate-holding mechanism that the valve is opened or closed according as the blow-plate-holding mechanism is rendered operative or inoperative.

13. In apparatus of the character indicated, the combination, with the neck-mold, a suitably-supported blow-plate shiftable into an operative position upon the neck-mold and having an air passage-way extending thereto and arranged to register with the neck-mold's chamber in the blow-plate's operative position, and mechanism for actuating the blow-plate from an inoperative to an operative position, or vice versa, of mechanism instrumental in holding the blow-plate down upon the neck-mold when the blow-plate is in an operative position, an air-pressure-supply pipe, a flexible tube having one end thereof connected to and in open relation with the air passage-way of the blow-plate, a valve-casing interposed between the other end of the said tube and the air-supply pipe, the valve within the valve-casing, an operative connection between the said valve and the aforesaid blow-plate-holding mechanism, and the arrangement of parts being such that the valve is opened or closed according as the blow-plate-holding mechanism is rendered operative or inoperative.

14. Apparatus of the character indicated, comprising a vertically-movable plunger, mechanism for operating the plunger, the press-mold movable underneath the plunger, a vertically-movable neck-mold movable in line with the plunger and having the upper end of its chamber enlarged transversely, and the mold-ring embracing and movable with the plunger and having a limited vertical movement independently of the plunger, means acting to retain the said ring in its normal position, and the arrangement of parts being such that the aforesaid ring shall engage the upper enlarged end of the neck-mold's chamber during the operation of the plunger within the press-mold.

15. In apparatus of the character indicated, the combination, with a blow-mold having the surrounding wall of its chamber divided centrally into two upright sections, two horizontally-arranged base-forming parts bearing the different mold-sections, respectively, which base-sections are pivoted vertically to any suitable support in such a manner as to render them capable of being swung apart or toward each other, a horizontally-arranged cam-plate arranged below the said base-sections and turnable in a horizontal plane, and such an operative connection between the plate and the base-sections as will move the latter apart or toward each other upon turning the plate in the one or the other direction.

Signed by us at Akron, Ohio, this 23d day of November, 1899.

JONATHAN HALEY.
HARRY H. BRIDGWATER.

Witnesses:
 E. P. OTIS,
 C. H. DORER.